(12) United States Patent
Merrill et al.

(10) Patent No.: US 8,256,611 B2
(45) Date of Patent: Sep. 4, 2012

(54) CAMERA COVER ALLOWING CONCEALED USE OF LENS AND CAMERA

(76) Inventors: Robert Frederick Merrill, Gainsville, FL (US); Timothy Mitchell Winfree, Brighton, MA (US)

( * ) Notice: Subject to any disclaimer, the term of this patent is extended or adjusted under 35 U.S.C. 154(b) by 22 days.

(21) Appl. No.: 12/826,005

(22) Filed: Jun. 29, 2010

(65) Prior Publication Data

US 2011/0024314 A1 Feb. 3, 2011

Related U.S. Application Data (60) Provisional application No. 61/269,900, filed on Jun. 30, 2009.

(51) Int. Cl.
*B65D 85/38* (2006.01)

(52) U.S. Cl. ............... 206/316.2; 206/578; 224/908

(58) Field of Classification Search ............... 206/316.1, 206/316.2, 316.3, 305, 578; 224/257; 150/154, 150/165
See application file for complete search history.

(56) References Cited

U.S. PATENT DOCUMENTS

| | | | |
|---|---|---|---|
| 4,232,808 A | 11/1980 | Gray | |
| 4,549,589 A * | 10/1985 | Nguyen | 206/316.2 |
| 4,601,318 A | 7/1986 | Diegelman | |
| 4,649,973 A | 3/1987 | Uchin | |
| 4,751,950 A * | 6/1988 | Bock | 206/316.2 |
| 4,917,241 A | 4/1990 | Hanson | |
| 4,927,017 A * | 5/1990 | Easter | 206/316.2 |
| 4,982,841 A * | 1/1991 | Goedecke | 206/316.2 |
| 5,064,062 A * | 11/1991 | Miller | 206/316.2 |
| 5,172,838 A * | 12/1992 | Rowell et al. | 224/680 |
| 5,669,020 A * | 9/1997 | Hopmeyer | 396/27 |
| 6,305,537 B1 | 10/2001 | Jaffe | |
| 7,293,648 B2 | 11/2007 | Doran, Jr. | |
| 2009/0266727 A1* | 10/2009 | Fair et al. | 206/316.2 |
| 2010/0012536 A1* | 1/2010 | Winsche | 206/316.2 |

FOREIGN PATENT DOCUMENTS

DE 3431426 A1 * 7/1985

* cited by examiner

*Primary Examiner* — David Fidei
(74) *Attorney, Agent, or Firm* — Holland & Hart LLP

(57) ABSTRACT

A camera cover comprising a surrounding sidewall that has an interior sized and configured for receiving and housing a camera. The sidewall defines opposed first and second openings through which the camera may be operated. A camera mount is connected to the surrounding sidewall and is operative to secure the camera within the interior with the camera's lens directed to one of the first and second openings. The camera cover preferably includes a strap with opposed first and second end portions that are each removably fastened to the surrounding sidewall. The end portions of the strap may each include an extension strap securable to the camera. The camera cover includes a first closure associated with the first opening and a second closure associated with the second opening. The first closure comprises a first flap and a magnetic latch and the second closure comprises a second flap and a zipper.

15 Claims, 6 Drawing Sheets

CAMERA COVER ALLOWING CONCEALED USE OF LENS AND CAMERA

CROSS-REFERENCE TO RELATED APPLICATIONS

The present application claims the benefit of U.S. Provisional Application Ser. No. 61/269,900 filed Jun. 30, 2009, the disclosure of which is hereby incorporated by reference in its entirety.

BACKGROUND

Cameras are delicate instruments that are often protected from the elements and their surroundings with a camera bag or case. Generally, in order to take a photograph the camera must be removed from its case. However, removing the camera from its case exposes the camera to undesirable elements of the environment such as dirt and water. Another drawback of traditional camera bags, which require the camera to be removed prior to taking a photo, is that in certain situations it is desirable to obscure a camera from view while taking a picture. In an investigation, for example, it is often desirable to take photographs of someone surreptitiously. Large cameras, especially those with large telephoto lenses, are often readily recognizable. Removing a camera from its case or bag may alert the subject to the photographer's presence. Accordingly, it is desirable to have a camera bag that allows a user to take photographs without removing the camera from the protection and obscurity afforded by the bag.

Camera cases exist that allow photographs to be taken without completely removing the camera from its camera bag. However, these camera bags are generally not adjustable to the camera's lens length, which can cause undesirable shading or shadowing of the lens. On the other hand, if the camera lens extends beyond the bag it is more obvious that the user is wielding a camera, thereby limiting a user's ability to take photographs without being noticed. Indeed, many camera cases leave the camera in plain sight or conform to the shape of the camera, thereby failing to conceal the presence of a camera even when the camera is in its case.

Most camera bags includes their own strap in addition to the camera's strap. Having a strap on both the camera and camera bag takes up space in the bag and requires a user to don a second strap if the camera is to be secured around his/her/neck, which may require more time to prepare for taking a photograph. The alternative of removing the camera strap poses yet another inconvenience to the user in that the camera can no longer be secured about the user's neck unless the camera's strap is reinstalled.

Some camera bags provide quick access to a camera or allow the back of the camera to be operated without being removed from its camera bag. These existing camera bags, however, do not allow for lens operation/picture-taking without removing the camera from the bag. As a result, these bags may require more time to access the camera in order to take a photograph.

Accordingly, there is a need for a camera bag or cover that has an adjustable length which allows the bottom opening to line up with the ends of a variety of lens lengths and provides a lens with an unobstructed view for the taking of photographs while keeping it under the bag's cover. Also, there is a need for a camera cover that allows the camera to remain secured around a user's neck even if the cover is removed. Furthermore, there is a need for a camera cover that allows quick access to the camera's controls and the camera's lens.

There is a still further need for such a camera cover that conceals the camera and its lens during use.

SUMMARY

Described herein are various embodiments of a camera cover that allows concealed use of lens and camera. The camera cover comprises a surrounding sidewall, which may comprise a flexible material that has an interior sized and configured for receiving and housing a camera. The sidewall defines opposed first and second openings through which the camera may be operated. A camera mount is connected to the surrounding sidewall and is operative to secure the camera within the interior with the camera's lens directed to one of the first and second openings. The camera mount may also be disposed in the surrounding sidewall. The camera mount may comprise a plate supported by the sidewall that includes an opening, such as a slot, for receiving a fastener adapted to interface with the camera.

The camera cover preferably includes a strap with opposed first and second end portions that are each removably fastened to the surrounding sidewall. The strap is preferably fastened to an interior side of the surrounding sidewall proximate the first opening. The end portions of the strap may each include an extension strap securable to the camera. The end portions may be fastened to the sidewall with suitable fasteners, such as button snaps or hook and loop materials, for example.

The camera cover includes a first closure associated with the first opening and a second closure associated with the second opening. The first closure comprises a first flap and a magnetic latch and the second closure comprises a second flap and a zipper. The second flap is configured to be folded into the interior of the camera cover. The cover may include cooperative hook and loop fastening material disposed on an interior side of the second flap and on an interior side of the surrounding sidewall that is adjacent to the second flap.

The foregoing and other features, utilities, and advantages of the camera cover will be apparent from the following more particular description of the embodiments as illustrated in the accompanying drawings.

BRIEF DESCRIPTION OF THE DRAWINGS

The accompanying drawings, which are incorporated in and constitute a part of this specification, illustrate embodiments of a camera cover and together with the description, serve to explain the principles and operation thereof. Like items in the drawings are generally referred to using the same numerical reference.

DETAILED DESCRIPTION

Described herein is a camera bag, or cover, that permits discreet operation of both a camera and its lens while the camera remains covered by the bag and secured by a strap around a user's neck. The cover allows quick access to the camera which helps prevent photographic opportunities from being missed, while its discreet functionality is particularly useful in situations where the photographer may not want to draw attention to him/herself or the camera.

Figure 1:
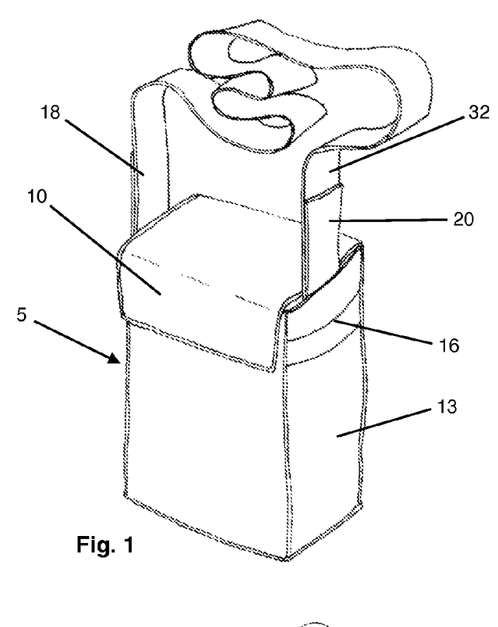
FIG. 1 is a perspective view of a camera cover according to a first exemplary embodiment with the shoulder strap attached and the camera flap closed.
Figure 2:
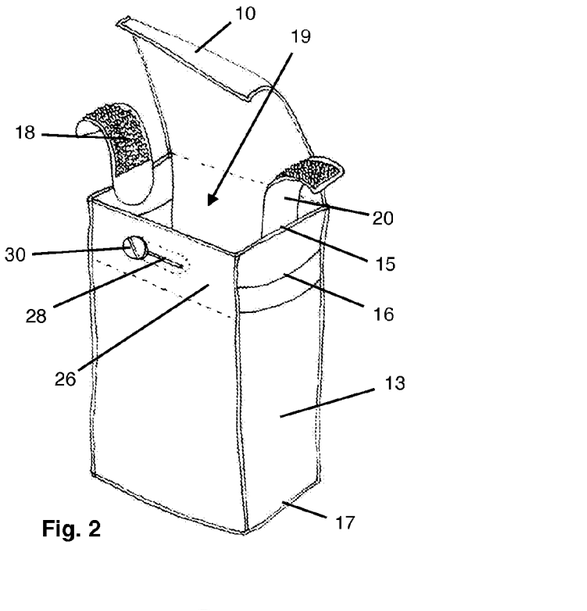
FIG. 2 is a perspective view of the camera cover shown in FIG. 1 with the shoulder strap removed and the camera flap opened.

FIG. 1 illustrates a camera cover 5 according to a first exemplary embodiment. In this embodiment camera cover 5 is in the form of a bag. The cover includes a surrounding sidewall 13 along with a top, or camera, closure 10 and a bottom, or lens, closure 12 (see FIG. 6). In this case, surrounding sidewall 13 includes 4 sides that when combined with closures 10 and 12 surround a camera on all six sides. With further reference to FIG. 2, surrounding sidewall 13 defines camera opening 15, lens opening 17, and surrounds interior 19. Interior 19 is configured to receive and house a camera. Although shown in the various embodiments as a particular size and shape, the cover may be made in larger and smaller sizes to accommodate many different cameras as well as video cameras. The cover may also include any number of pockets that may be added to provide storage space for small items within the cover or bag.

Camera cover 5 may be constructed from any suitable material. For example, the cover may comprise a flexible material such as fabric or canvas. Suitable fabrics include polyester, nylon, hemp, and cotton, to name a few. Water resistant materials, such as for example, rubber, PVC or polyurethane coated fabrics, may also be desirable. The cover may also be comprised of rigid materials or combinations of flexible and rigid materials. Examples of rigid materials that may be used include plastic or fiberboard.

As can be appreciated with reference to FIG. 2, the camera closure flap 10 may be opened to allow a camera to be inserted through camera opening 15 and into interior 19. It should also be appreciated that a camera may be received and operated through lens opening 17 as well. The camera closure flap 10 may be maintained in the closed and open positions by, for example, cooperative hook-and-loop materials, buttons, magnets and the like.

In this embodiment, neck strap 32 is removably attached to surrounding sidewall 13 via strap flaps 18 and 20, which are secured just inside camera opening 15. In this case, neck strap 32 connects to strap flaps 18 and 20 with cooperative through hook-and-loop materials as is known in the art. In addition to being attached to the cover, neck strap 32 may also be attached to the camera as described more fully below.

A camera mount base-plate 26 is embedded between the fabric directly under the area where the base of the camera rests as shown in FIG. 2. A camera attachment screw 30 passes through this plate and secures the camera to the plate to keep it from moving within the bag. An attachment screw track, or slot, 28 allows the camera's position to be moved left and right to accommodate a wide range of camera models of varying sizes. The slot may also be oriented such that the camera may be adjusted fore and aft of the interior 19. Moreover, multiple slots may be incorporated in the mount to allow adjustments for various camera models.

Figure 3:
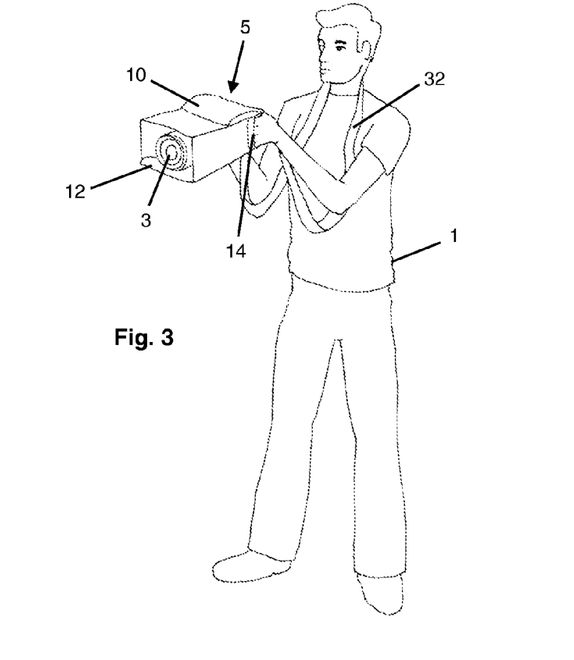
FIG. 3 is an environmental perspective illustrating the camera cover in a deployed configuration allowing the user to operate the camera.
Figure 4:
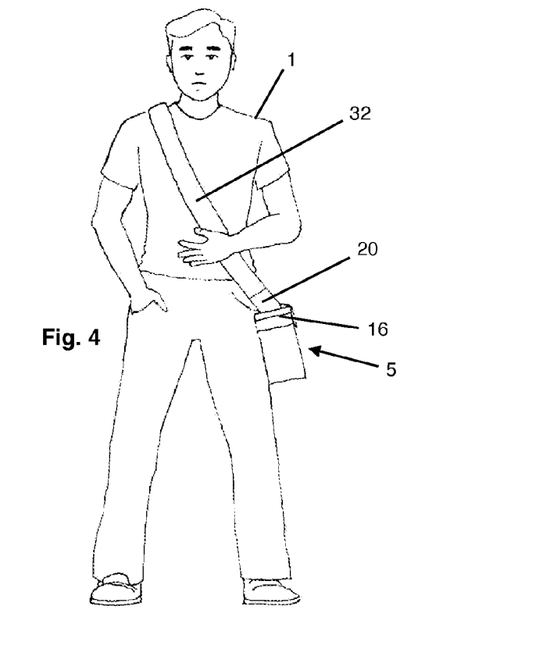
FIG. 4 is an environmental perspective of the camera cover in a stowed configuration and being worn by a user.

FIG. 3 illustrates user 1 operating camera 2 with both the camera closure 10 and lens closure 12 opened. It should be noted that even with the closures 10 and 12 in the opened position, camera 2 and lens 3 are still substantially surrounded by cover 5. Thus, the camera and lens are obscured from view of the casual observer and protected from environmental conditions such as rain and dust. FIG. 4 illustrates closure flap 10 in the closed position. In this configuration the camera is completely hidden from view and the closure 5 appears to be a generic hand bag. In this configuration lens flap 12 could be closed for complete camera protection or open for quicker deployment of the camera when a photo opportunity arises. Camera cover 5 allows camera 2 and lens 3 to be operated from within the cover 5, as seen in FIG. 3, while still permitting the user to quickly return the camera to its original stowed position at the user's side, as shown in FIG. 4. This is particularly useful because it helps the user capture photographic opportunities typically missed while time is spent retrieving the camera from a conventional camera bag and securing it via its camera strap around his/her neck.

Figure 5:
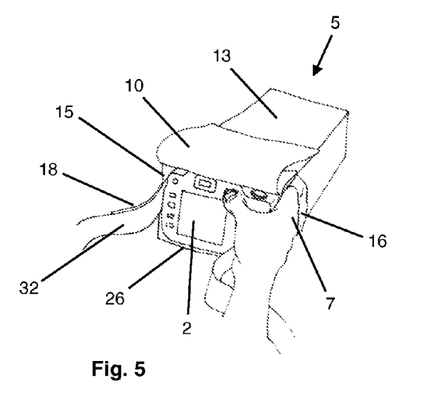
FIG. 5 is a partial perspective view of the camera cover with the camera flap open to allow access to the camera housed within.

In this embodiment, camera cover 5 includes left and right side hand slits 14 and 16 respectively, the use of which is perhaps best shown in FIG. 5. Hand slits 14 (FIG. 3) and 16 allow a user's fingers 7 to access the interior 19 of the cover where he/she can grab hold of the camera 2. When the top closure flap 10 is open a user can grip the camera and manipulate the camera controls while the rest of the camera and lens remains enclosed in the bag.

Figure 6:
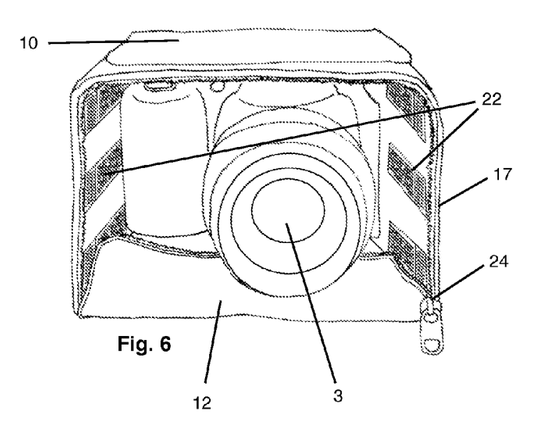
FIG. 6 is a perspective view illustrating the lens opening of the camera cover with the end portion of the lens flap open to reveal a camera inside with its lens directed toward the lens opening.
Figure 7:
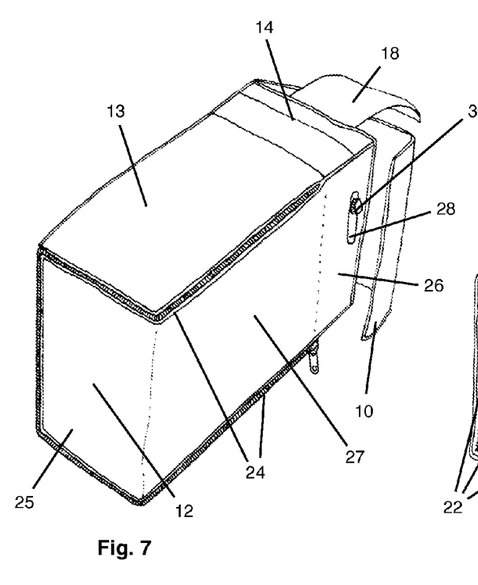
FIG. 7 is a perspective view of the camera cover showing the lens flap closed and the top-to bottom zipper in the fully closed position.
Figure 8:
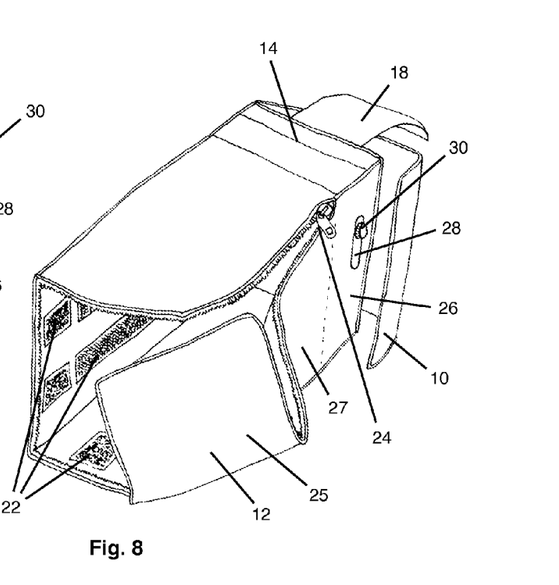
FIG. 8 is a perspective view of the camera cover showing both the end and side portions of the lens flap and the top-to-bottom zipper in the fully opened position.

As illustrated in FIGS. 6-8, the end portion 25 of lens closure flap 12 can be unzipped via the front-to-bottom zipper 24 and folded inward, providing the lens an unobstructed view for the taking of photographs. This flap is held in place by hook-and-loop fasteners 22 located on the interior side of surrounding sidewall 13 and lining the interior of the bag.

Additional hook-and-loop fasteners 22 also line the cover's interior to allow the bottom of the cover to be held in place if folded inward as described more fully below with respect to FIGS. 19A-19C. The placement and number of interior panel fasteners 22 can vary. It should also be appreciated that other types of fasteners may be used, such as button snaps and the like. This capability allows the cover's length to be altered to suit the user as well as a variety of lens lengths. Lens closure flap 12 is comprised of an end portion 25 and a side portion 27, which makes up a portion of surrounding sidewall 13. While the side hand slits 14/16 found in this embodiment and top closure flap 10 provides access to the back and sides of the camera, the top-to-bottom zipper 24 allows users to create an opening through side portion 27 which allows access to the lens, as can be understood with reference to FIG. 8. While lens closure flap 12 is shown here to include zipper 24, other suitable fasteners may be used, such as buttons, hook-and-loop fasteners, or the like.

Figure 9:
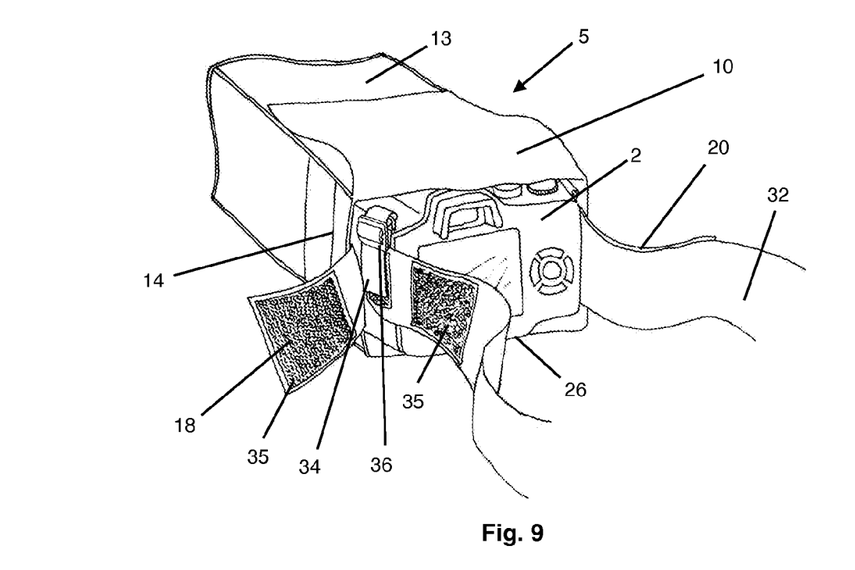
FIG. 9 is an enlarged partial perspective view of the camera opening illustrating the connection of the neck strap to both the camera and the surrounding sidewall of the camera cover.
Figure 10:
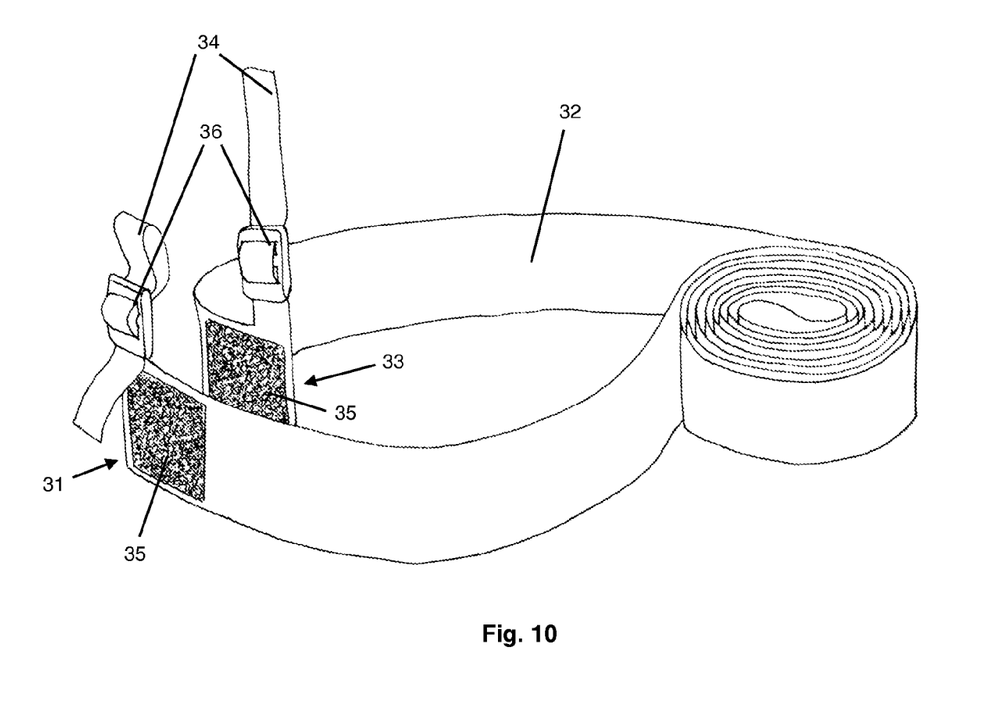
FIG. 10 is a perspective view of the neck strap illustrating the end portions of the neck strap.

Camera cover 5 eliminates the need for separate camera and bag straps by providing a single shoulder, or neck, strap 32 that connects to both camera 2 and cover 5 as shown in FIG. 9. Neck strap 32 includes end portions 31 and 33 which are configured to interface with both the camera 2 and cover 5. As mentioned above, in this embodiment, strap 32 connects to camera 2 via hook-and-loop fasteners 35 located on both the strap 32 and on each of the two side strap flaps 18/20. With further reference to FIG. 10, extension straps 34 extend from the ends of the shoulder strap, loop through the camera's eyelet, and return through a strap slide, or buckle, 36 to secure the shoulder strap to the camera. Accordingly, camera 2 may be removed from camera cover 5 by disconnecting the hook and loop fasteners 35 from each other. Thus the camera remains secure around the user's neck without the need for multiple straps.

Figures 11, 12:
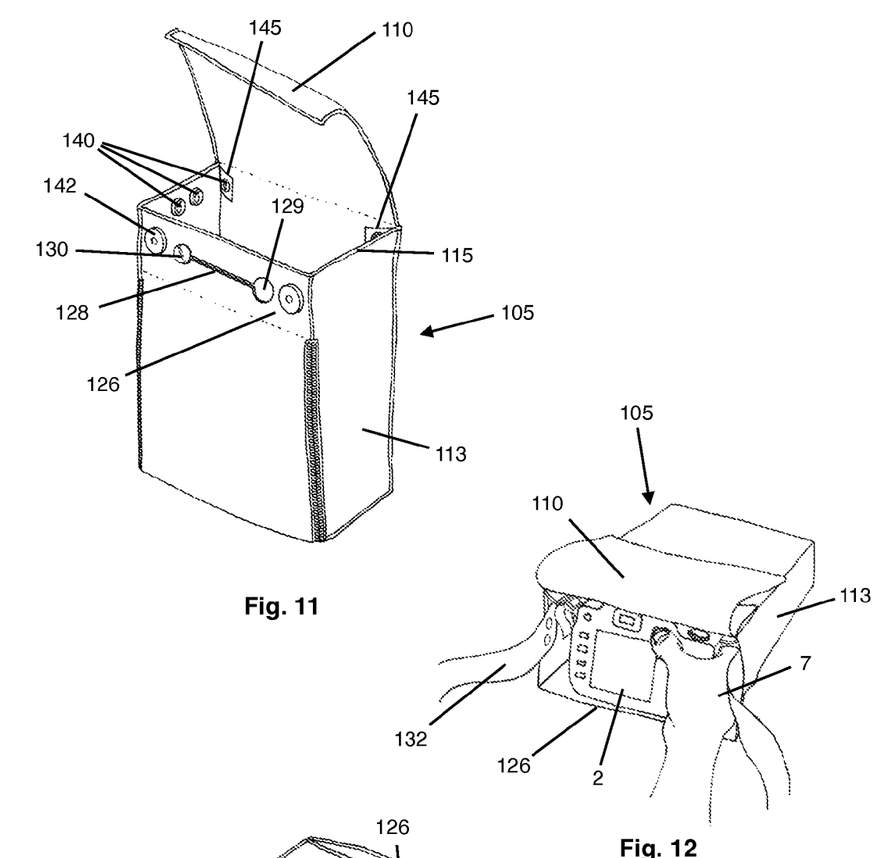
FIG. 11 is a perspective view of a camera cover according to a second exemplary embodiment with the shoulder strap removed and the camera flap opened.
FIG. 12 is a partial perspective view of the camera cover shown in FIG. 11 with the camera flap open to allow access to the camera housed within.

FIG. 11 illustrates a camera cover 105 according to a second exemplary embodiment. Like camera cover 5, camera cover 105 includes a surrounding sidewall 113 along with a camera closure flap 110 and a lens closure flap 112 (see FIG. 13). Surrounding sidewall 113 defines camera opening 115 and lens opening 117. However, camera cover 105 does not include the side slits as described above with respect to the first embodiment. As can be seen in FIG. 12, it is contemplated that the user 1 may grasp camera 2 by inserting his/her hand(s) 7 between surrounding sidewall 113 and camera 2. In this embodiment, camera closure 110 is secured in the open and closed positions by magnetic clasps 142 on the camera mount base-plate 126 and on the flap 110 (not shown). Base plate 126 also includes a quick release configuration. In this case, track 128 includes a hole 129 that is large enough for the head of fastener 130 to fit through. Thus, fastener 130 does not need to be fully removed from the camera in order to remove the camera from cover 105.

Figure 13:
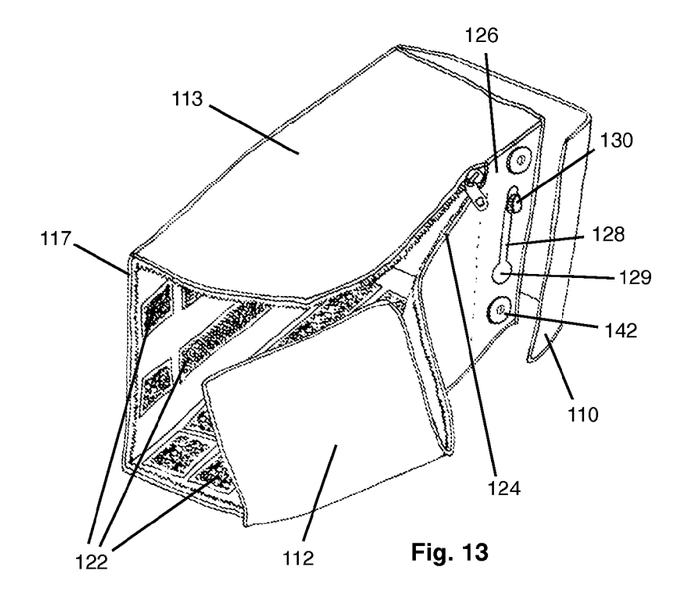
FIG. 13 is a perspective view of the camera cover shown in FIGS. 11 and 12 illustrating the end and side portions of the lens flap and the top-to-bottom zipper in the fully opened position.

As illustrated in FIG. 13, lens closure flap 112 can be unzipped via the front-to-bottom zipper 124 and folded inward, providing the lens an unobstructed view for the taking of photographs. This flap is held in place by hook-and-loop fasteners 122 located on the interior side of surrounding sidewall 113 and lining the interior of the bag. As in the first embodiment, additional hook-and-loop fasteners 122 also line the cover's interior to allow the bottom of the cover to be held in place if folded inward in order to vary the length of the cover.

Figure 14:
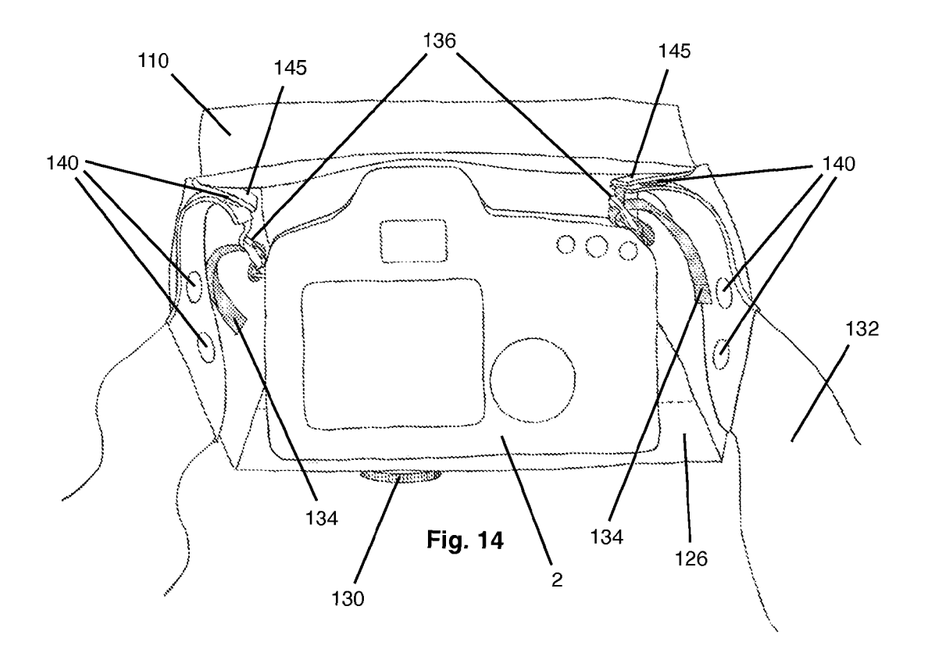
FIG. 14 is a partial perspective view of the camera cover shown in FIGS. 11-13 with the camera flap open illustrating the attachment of the neck strap.
Figure 15:
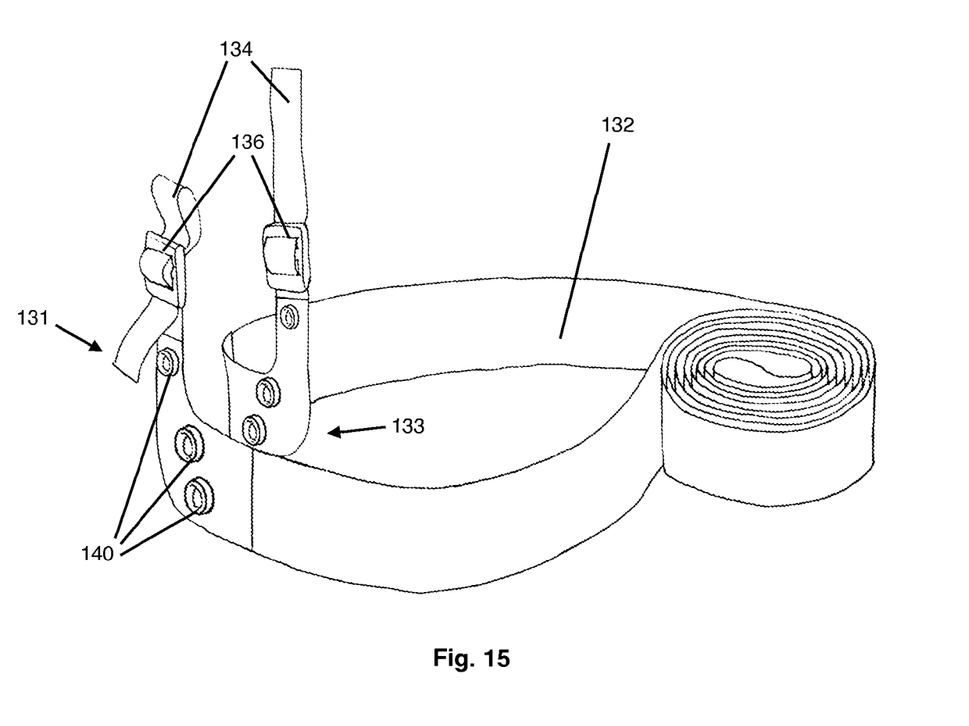
FIG. 15 is a perspective view of the neck strap shown in FIG. 14.

Referring to FIGS. 14 and 15 in addition to FIG. 11, it can be appreciated that neck strap 132 is removably attached to the interior of surrounding sidewall 113 with cooperative snap buttons 140 located both on the cover's interior and on the strap itself. Neck strap 132 includes end portions 131 and 133 as shown in FIG. 15. End portions 131 and 133 include snap buttons 140 and extension straps 134 along with buckles 136. As perhaps best shown in FIG. 14, snaps 140 are located on the sides of camera 2 and on ears 145 located at the intersection where the top and sides of camera opening 115 meet. Accordingly, end portions 131 and 133 are attached such that they are out of the way and leave a convenient space around the camera through which a user may grasp the camera as show in FIG. 12.

Figure 16A:
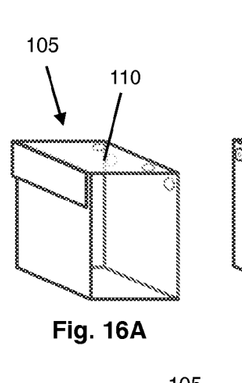
FIGS. 16A-16D are schematic representations of a cover according to the second exemplary embodiment illustrating the opening of the camera flap.
Figures 16B, 16C:
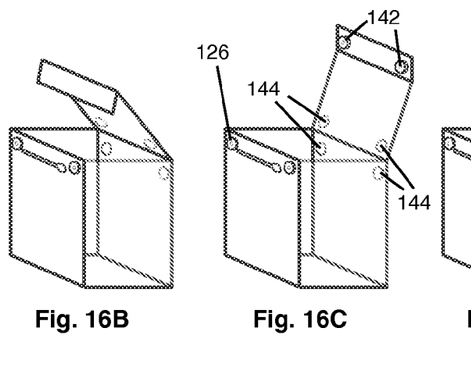
Figure 16D:
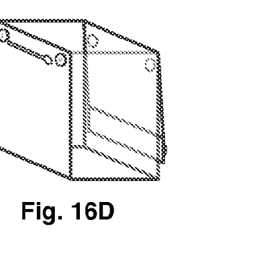

Having described features of the camera cover, the operation of some of those features is described with respect to FIGS. 16A-19C. The operation of camera flap 110 is shown in FIGS. 16A-16D. In FIG. 16A, flap 110 is closed with magnets 142 which are attracted to corresponding magnets on base-plate 126. FIG. 16D illustrates cover 105 held in the fully open position with magnets 144 (see FIG. 16C) mated to each other. One of ordinary skill in the art will recognize that various combinations of magnets and ferrous materials could be used to maintain flap 110 in the open and closed positions. For example, as an alternative, ferrous materials could be used as the base plate 126 and embedded in the surrounding sidewall, while magnets are attached to flap 110.

Figures 17A, 17B, 17C:
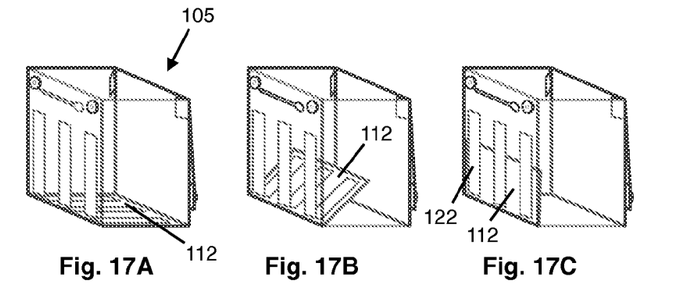
FIGS. 17A-17C are schematic representations of a cover according to the second exemplary embodiment illustrating the opening of the end portion of the lens flap.

FIGS. 17A-17C illustrate the operation of lens closure flap 112. In FIG. 17A, lens closure flap 112 is in the closed position. FIG. 17C shows lens closure flap 112 in the open position. As explained above, lens closure 112 may be held in the open position with hook-and-loop material 122, for example.

Figures 18A, 18B:
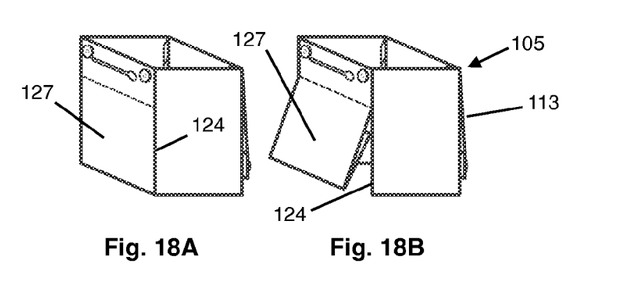
FIGS. 18A-18B are schematic representations of a cover according to the second exemplary embodiment illustrating the opening of the side portion of the lens flap.

Access to a camera's lens is illustrated in FIGS. 18A and 18B. Once the lens flap 112 is folded into the interior of camera cover 105, zipper 124 may be further unzipped to allow side portion 127 of flap 112 to open away from the remainder of surrounding sidewall 113. Thus, the lens may be accessed for easy focusing or changing.

Figure 19A:
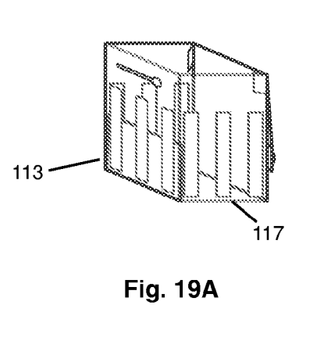
FIGS. 19A-19C are schematic representations of a cover according to the second exemplary embodiment illustrating shortening the length of the cover.
Figures 19B, 19C:
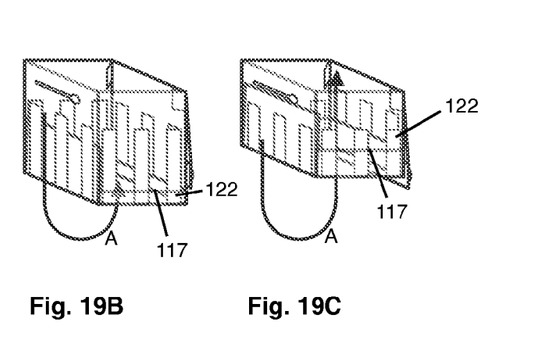

FIGS. 19A-19C illustrate how the length of the camera cover may be adjusted to suit various camera lens lengths. As indicated by arrow "A" in FIGS. 19B and 19C, lens opening 117 may be rolled into the interior of surrounding sidewall 113. As mentioned above, the interior walls of surrounding sidewall 113 may include cooperative hook and loop materials to secure the length of the cover at the desired length.

Methods relating to the above described camera cover are also contemplated. The methods thus encompass the steps inherent in the above described mechanical structures and operation thereof. Broadly, one method could include surrounding a camera with a sidewall having an interior sized and configured for receiving a camera wherein the sidewall defines opposed first and second openings through which the camera may be operated. A neck strap may be attached to the surrounding sidewall and camera. The camera is mounted to a mount comprising a plate disposed in the surrounding sidewall. The first and second openings are covered or closed to conceal and protect the camera. Thereafter, at least one of the first and second openings is uncovered to allow operation of the camera.

Accordingly, the camera cover has been described with some degree of particularity directed to the exemplary embodiments. It should be appreciated, though, that the present invention is defined by the following claims construed in light of the prior art so that modifications or changes may be made to the exemplary embodiments without departing from the inventive concepts contained herein.

What is claimed is:

1. A camera cover, comprising:
   a surrounding sidewall having an interior sized and configured for housing a camera, said sidewall defining opposed first and second openings; and a camera mount connected to said surrounding sidewall, said camera mount operative to secure the camera within said interior with the camera's lens directed to one of said first and second openings;

a first closure associated with said first opening, comprising a first flap and a magnetic latch;

a second closure associated with said second opening, comprising a second flap and a zipper, wherein said second flap is configured to be folded into said interior; and cooperative hook and loop fastening material disposed on an interior side of said second flap and on an interior side of said surrounding sidewall.

2. The camera cover according to claim 1, wherein said camera mount comprises a plate supported by said sidewall, said plate including an opening for receiving a fastener adapted to interface with the camera.

3. The camera cover according to claim 2, wherein said opening is a slot.

4. The camera cover according to claim 1, including a strap with opposed first and second end portions, wherein each said end portion is removably fastened to said surrounding sidewall.

5. The camera cover according to claim 4, wherein each said end portion includes an extension strap securable to the camera.

6. A camera cover, comprising:
a surrounding sidewall having an interior sized and configured for receiving a camera, said sidewall defining opposed first and second openings through which the camera may be operated;
a first closure associated with said first opening;
a second closure comprising a second flap associated with said second opening;
a strap including opposed first and second end portions, wherein each said end portion is removably fastened to said surrounding sidewall, and wherein each said end portion includes an extension strap securable to the camera; and
a camera mount connected to said surrounding sidewall, said camera mount operative to secure the camera within said interior with the camera's lens directed to one of said first and second openings, wherein said camera mount comprises a plate disposed in said surrounding sidewall, said plate including an opening for receiving a fastener adapted to interface with the camera.

7. The camera cover according to claim 6, wherein said end portions are removably fastened to said surrounding sidewall with button snaps.

8. The camera cover according to claim 6, wherein said camera cover is comprised of flexible material.

9. The camera cover according to claim 6, wherein said second flap is configured to be folded into said interior, and including cooperative hook and loop fastening material disposed on an interior side of said second flap and on an interior side of said surrounding sidewall that is adjacent to said second flap.

10. A camera cover, comprising:
a surrounding sidewall having an interior sized and configured for receiving a camera, said sidewall defining opposed first and second openings through which the camera may be operated;
a first closure associated with said first opening;
a second closure comprising a second flap associated with said second opening, wherein said second flap is configured to be folded into said interior, and including cooperative hook and loop fastening material disposed on an interior side of said second flap and on an interior side of said surrounding sidewall that is adjacent to said second flap; and
a strap including opposed first and second end portions, wherein each said end portion is removably connected to said surrounding sidewall, and wherein each said end portion includes an extension strap securable to the camera.

11. The camera cover according to claim 10, comprising a camera mount connected to said surrounding sidewall, said camera mount operative to secure the camera within said interior with the camera's lens directed to one of said first and second openings.

12. The camera cover according to claim 11, wherein said camera mount comprises a plate disposed in said surrounding sidewall, said plate including an opening for receiving a fastener adapted to interface with the camera.

13. A camera cover, comprising:
a surrounding sidewall having an interior sized and configured for receiving a camera, said sidewall defining opposed first and second openings through which the camera may be operated;
a camera mount comprising a plate disposed in said surrounding sidewall, said plate including an opening for receiving a fastener adapted to interface with the camera;
a first closure comprising a first flap associated with said first opening;
a second closure comprising a second flap associated with said second opening; and
a strap including opposed first and second end portions, wherein each said end portion is removably fastened to an interior side of said surrounding sidewall proximate said first opening, and wherein each said end portion includes an extension strap securable to the camera.

14. The camera cover according to claim 13, wherein said second flap is configured to be folded into said interior, and including cooperative hook and loop fastening material disposed on an interior side of said second flap and on an interior side of said surrounding sidewall that is adjacent to said second flap.

15. The camera cover according to claim 13, wherein said first closure comprises a magnetic latch and said second closure comprises a zipper.

* * * * *